US009446723B2

(12) United States Patent
Stepanski

(10) Patent No.: US 9,446,723 B2
(45) Date of Patent: Sep. 20, 2016

(54) INTERIOR PANELS FOR MOTOR VEHICLES AND METHODS FOR MAKING THE INTERIOR PANELS

(71) Applicant: Faurecia Interior Systems, Inc., Auburn Hills, MI (US)

(72) Inventor: David J. Stepanski, Auburn Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 148 days.

(21) Appl. No.: 14/065,767

(22) Filed: Oct. 29, 2013

(65) Prior Publication Data

US 2015/0115643 A1    Apr. 30, 2015

(51) Int. Cl.

| | |
|---|---|
| *B60R 13/01* | (2006.01) |
| *B60R 13/02* | (2006.01) |
| *B60R 13/08* | (2006.01) |
| *B29C 43/18* | (2006.01) |
| *B29C 43/14* | (2006.01) |
| *B29L 31/30* | (2006.01) |
| *B29C 43/36* | (2006.01) |

(52) U.S. Cl.
CPC ......... *B60R 13/0815* (2013.01); *B29C 43/145* (2013.01); *B29C 43/184* (2013.01); *B60R 13/0243* (2013.01); *B29C 2043/3605* (2013.01); *B29L 2031/3005* (2013.01)

(58) Field of Classification Search
CPC ............. B60R 13/02; B60R 13/0815; B60R 13/13011; B60R 13/011; B60R 13/0243; B29B 43/184; B29C 43/184; B29C 43/145; B29C 2043/3605; B29L 2031/3005
See application file for complete search history.

(56) References Cited

U.S. PATENT DOCUMENTS

| | | | |
|---|---|---|---|
| 6,939,599 B2 * | 9/2005 | Clark | 428/178 |
| 7,918,313 B2 | 4/2011 | Gross et al. | |
| 7,972,708 B2 * | 7/2011 | Schweiggart | B60R 13/0838 181/284 |
| 8,205,642 B2 * | 6/2012 | Straza | 138/39 |
| 2005/0118398 A1 | 6/2005 | Reichwein et al. | |
| 2005/0214500 A1 | 9/2005 | Hallows | |
| 2012/0312631 A1 * | 12/2012 | Curfman | G10K 11/168 181/286 |

FOREIGN PATENT DOCUMENTS

| | | |
|---|---|---|
| CN | 202390946 U | 8/2012 |
| FR | 2839995 A1 | 11/2003 |
| GB | 758059 A | 9/1956 |

* cited by examiner

*Primary Examiner* — Glenn Dayoan
*Assistant Examiner* — Melissa A Black
(74) *Attorney, Agent, or Firm* — Lorenz & Kopf LLP

(57) ABSTRACT

Interior panels for motor vehicles and methods for making interior panels are provided. In one example, an interior panel includes, but is not limited to a fiber reinforced composite substrate that has a first side and a second side that is opposite the first side. The fiber reinforced composite substrate defines a plurality of inwardly tapered pockets. The inwardly tapered pockets are arranged proximate to each other and extend between the first and second sides. Each of the inwardly tapered pockets has an open end that is disposed in the second side and a closed end that is disposed adjacent to the first side.

13 Claims, 6 Drawing Sheets

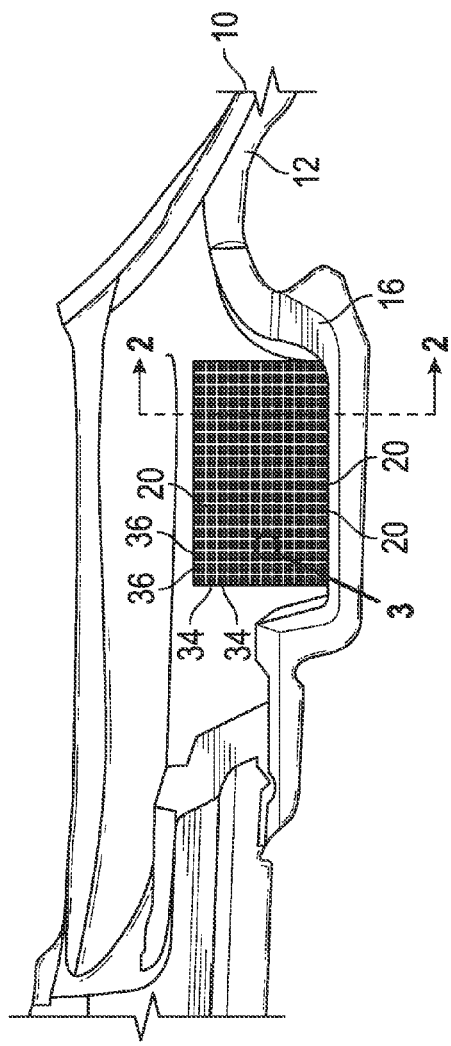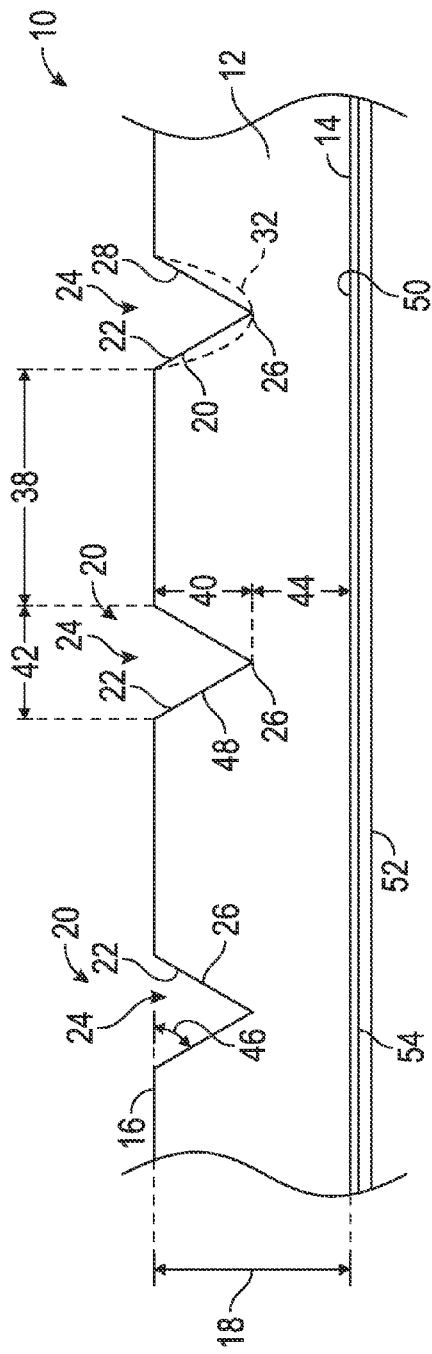
FIG. 1
FIG. 2

INTERIOR PANELS FOR MOTOR VEHICLES AND METHODS FOR MAKING THE INTERIOR PANELS

TECHNICAL FIELD

The technical field relates generally to interior panels for motor vehicles, and more particularly to interior panels for motor vehicles with improved properties such as sound deadening and methods for making such interior panels.

BACKGROUND

Motor vehicles typically include various interior panels such as in the passenger compartment area of the motor vehicle to provide various functions and/or aesthetics. Non-limiting examples of interior panels include instrument panels, door panels, consoles, glove box doors, roof liners, and the like. Many of these interior panels include a substrate for structure and a decorative or aesthetically desirable finish overlying the substrate.

The passenger compartment areas of motor vehicles are also typically insulated from annoying sounds that may be transmitted, for example, through the frame and body of the vehicle. These sounds often originate from the tires as they interact with the road surface, from external wind, or from the operation of the engine and other mechanical parts of the vehicle. In U.S. Pat. No. 7,918,313 issued to Gross et al., acoustic blankets or pads are installed in a passenger compartment just behind the vehicle interior panels. The acoustic blankets or pads serve to dampen, block, absorb or attenuate unwanted road noise and external sounds. Unfortunately, the acoustic blankets or pads are in addition to the vehicle interior panels and can be expensive, requiring additional labor to install, and generally add weight without providing any structural benefit to the interior panels.

Accordingly, it is desirable to provide interior panels with improved properties such as sound deadening to reduce or eliminate the need for acoustic blankets or pads to acoustically insulate the passenger compartment from annoying sounds, and methods for making such interior panels. Furthermore, other desirable features and characteristics of the present invention will become apparent from the subsequent detailed description and the appended claims, taken in conjunction with the accompanying drawings and this background.

BRIEF SUMMARY

Interior panels for motor vehicles and methods for making such interior panels are provided herein. In accordance with an exemplary embodiment, an interior panel includes, but is not limited to a fiber reinforced composite substrate that has a first side and a second side that is opposite the first side. The fiber reinforced composite substrate defines a plurality of inwardly tapered pockets. The inwardly tapered pockets are arranged proximate to each other and extend between the first and second sides. Each of the inwardly tapered pockets has an open end that is disposed in the second side and a closed end that is disposed adjacent to the first side.

In accordance with another exemplary embodiment, a method for making an interior panel for a motor vehicle is provided. The method includes, but is not limited to the steps of heating a fiber reinforced composite blank to form a heated fiber reinforced composite blank. The heated fiber reinforced composite blank is compression molded to form a fiber reinforced composite substrate. The fiber reinforced composite structure has a first side and a second side and defines a plurality of inwardly tapered pockets. The inwardly tapered pockets are arranged proximate to each other and extend between the first and second sides. Each of the inwardly tapered pockets has an open end that is disposed in the second side and a closed end that is disposed adjacent to the first side.

BRIEF DESCRIPTION OF THE DRAWINGS

The various embodiments will hereinafter be described in conjunction with the following drawing figures, wherein like numerals denote like elements, and wherein:

FIG. 1 illustrates, in side view, an interior panel for a motor vehicle in accordance with an exemplary embodiment;

FIG. 2 illustrates, in cross-sectional view, the interior panel depicted in FIG. 1 along line 2-2;

DETAILED DESCRIPTION

Figure 3:
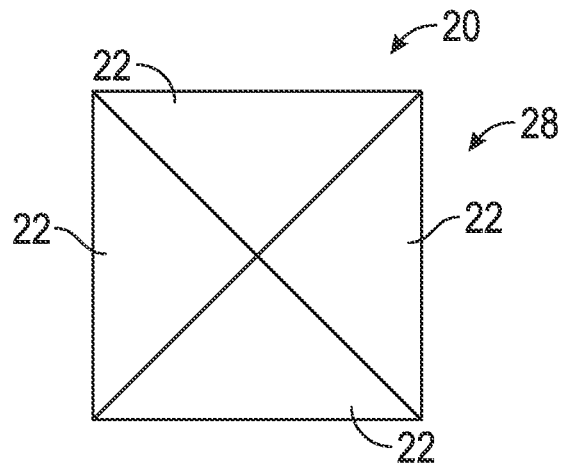
FIG. 3 illustrates an enlarged view of a portion of the interior panel depicted in FIG. 1 in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to interior panels for motor vehicles and methods for making such interior panels. The exemplary embodiments taught herein provide an interior panel that comprises a fiber reinforced composite substrate. The fiber reinforced composite substrate is formed of fibers and resin that binds the fibers together. The fibers function as reinforcing elements (e.g., relatively high stiffness) and the resin functions as a load transferring matrix between the reinforcing elements. In an exemplary embodiment, the fibers and resin have relatively low densities. As such, the fiber reinforced composite substrate can advantageously have a relatively high specific stiffness, e.g., relatively stiff and light weight.

The fiber reinforced composite substrate has a first side, for example configured to face a passenger compartment of a motor vehicle, and a second side that is opposite the first side and that, for example is configured to face a body and/or frame structure of the motor vehicle. The fiber reinforced composite substrate defines a plurality of inwardly tapered pockets. The inwardly tapered pockets are arranged proximate to each other and extend between the first and second sides. Each of the inwardly tapered pockets has an open end that is disposed in the second side and a closed end that is disposed adjacent to the first side. In an exemplary embodiment, when the interior panel is installed in the motor vehicle, sound transmitted, for example, through the frame and body of the motor vehicle enters the open ends of the inwardly tapered pockets and propagates towards the closed ends and is at least partially dampened, absorbed, or attenuated in the inwardly tapered pockets to reduce or minimize the sound. As such, the need for acoustic blankets, pads, or other sound absorbing materials arranged behind the interior panel for acoustic insulation is reduced or eliminated.

FIGS. 1-2 illustrate, in side and cross-sectional views, respectively, an interior panel 10 for a motor vehicle in accordance with an exemplary embodiment. The interior panel 10 comprises a fiber reinforced composite substrate 12. As discussed above, the fiber reinforced composite substrate 12 may be formed of fibers and resin that binds the fibers together. Non-limiting examples of fibers include inorganic fibers, such as, for example, S-glass fibers, E-glass fibers, carbon fibers, and the like, or organic fibers, such as, for example, natural fibers (e.g. fibers from a lignocellulosic material or other biological source), polyethylene fibers, and the like. Non-limiting examples of resins include thermoplastic resins, such as, for example, polyethylene, polypropylene, polyester, polyamide, and the like or thermoset resins such as polyester, polyurethane, epoxy, and the like. In one example, the fibers are natural fibers and the resin is a thermoplastic resin such as polypropylene. Advantageously, natural fibers and polypropylene have relatively low densities. As such, the fiber reinforced composite substrate 12 can be relatively stiff and light weight.

The fiber reinforced composite substrate 12 has a first side 14 and a second side 16 that is opposite the first side 14. In an exemplary embodiment, the fiber reinforced composite substrate 12 has a thickness defined from the first side 14 to the second side 16 (indicated by double headed arrow 18) of from about 2 to about 3 mm.

As illustrated, a plurality of inwardly tapered pockets 20 are formed in the fiber reinforced composite substrate 12 extending between the first and second sides 14 and 16. In particular, the inwardly tapered pockets 20 are defined by inclined sidewalls 22 that form open ends 24 in the second side 16 and that extend towards the first side 14 to form closed ends 26. In an exemplary embodiment, sound directed towards the second side 16 can advantageously enter the open ends 24 and propagates towards the closed ends 26 and is at least partially dampened, absorbed, or attenuated in the inwardly tapered pockets 20 to facilitate acoustic dampening (e.g., sound deadening).

Figure 4:
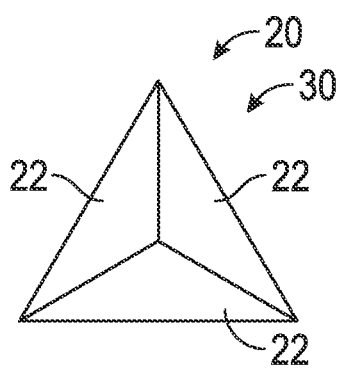
FIG. 4 illustrates an enlarged view of a portion of the interior panel depicted in FIG. 1 in accordance with an exemplary embodiment.
Figure 5:
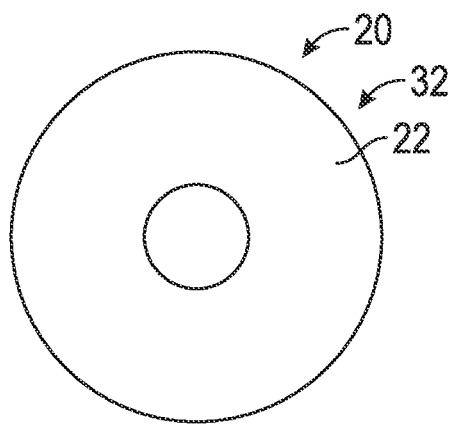
FIG. 5 illustrates an enlarged view of a portion of the interior panel depicted in FIG. 1 in accordance with an exemplary embodiment.

In an exemplary embodiment, the inclined sidewalls 22 are substantially straight and correspondingly arranged as a four sided pyramid such that the inwardly tapered pockets 20 have a four sided pyramidal shape 28 as illustrated in FIG. 3, or correspondingly arranged as a three sided pyramid such that the inwardly tapered pockets 20 have a three sided pyramidal shaped 30 as illustrated in FIG. 4. In an alternative embodiment and as illustrated in FIG. 5, the inclined sidewalls 22 are inwardly curved (e.g., concave) and correspondingly arranged such that the inwardly tapered pockets 20 each have a dimple shaped 32 (see also dashed lines in FIG. 2).

Referring back to FIGS. 1-2, the inwardly tapered pockets 20 are spaced apart from each other. Advantageously, the inwardly tapered pockets 20 may be grouped together, for example in rows 34 and columns 36, to provide discrete areas on the interior panel 10 for acoustic dampening. In an exemplary embodiment, the inwardly tapered pockets 20 are advantageously spaced apart from each other a distance of from about 2 to about 10 mm (indicated by double headed arrow 38) to facilitate manufacturing and provide a suitable density of inwardly tapered pockets 20 for acoustic dampening. In an exemplary embodiment, the inwardly tapered pockets 20 each advantageously have a depth (indicated by double headed arrow 40) of from about 0.5 to about 1.5 mm to help dampen, absorb, or attenuate sound. In an exemplary embodiment, each of the open ends 24 advantageously has a maximum dimension (indicated by double headed arrow 42 of from about 2 to about 5 mm and further, each of the inwardly tapered pockets 20 has a depth to open end maximum dimension ratio of from about 1:6 to 1:1 to help dampen, absorbed, or attenuate sound. In an exemplary embodiment, the fiber reinforced composite substrate 12 has a remaining thickness (indicated by double headed arrow 44) from the closed end 26 of the corresponding inwardly tapered pocket 20 to the first side 14 of from about 1 to about 2 mm to maintain structural integrity of the fiber reinforced composite substrate 12. In an exemplary embodiment, the inclined sidewalls 22 extend from the second side 16 to the first side 14 advantageously at an angle (indicated by double headed arrow 46) of from about 20° to about 50° to help dampen, absorb, or attenuate sound.

As illustrated in FIG. 2, the inwardly tapered pockets 20 have tapered profiles 48 defined by the inclined sidewalls 22 and the first side 14 has a smooth profile 50 that is spatially independent from the tapered profiles 48. Having the smooth profile 50 of the first side 14 spatially independent from the tapered profiles 48 allows greater flexibility in providing a decorated finish overlying the first side 14. In an exemplary embodiment, the interior panel 10 further includes a cover skin 52 for providing a decorated finish. As illustrated, the cover skin 52 is bonded to the fiber reinforced composite substrate 12 with an adhesive 54 overlying the first side 14 of the fiber reinforced composite substrate 12.

Figure 6:
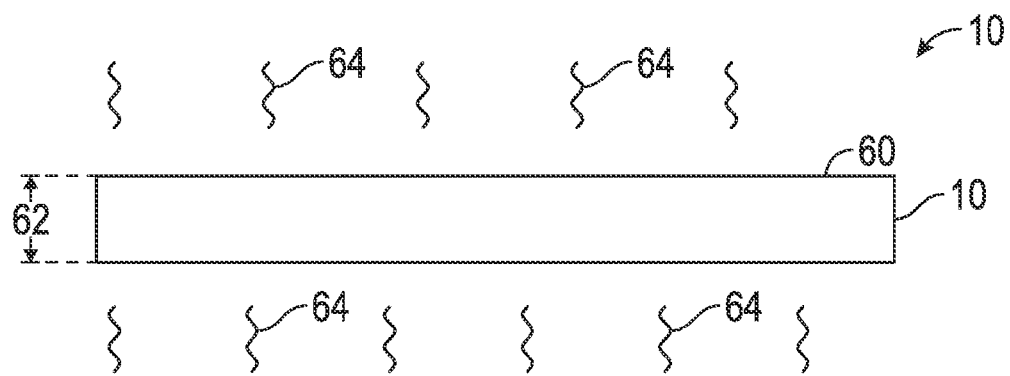
FIG. 6 illustrates, in cross-sectional view, an interior panel for a motor vehicle at an early fabrication stage in accordance with an exemplary embodiment.

FIG. 6 illustrates, in cross-sectional view, the interior panel 10 at an early fabrication stage in accordance with an exemplary embodiment. The fabrication of the interior panel 10 includes providing a fiber reinforced composite blank 60. As discussed above in relation to the fiber reinforced composite substrate 12, the fiber reinforced composite blank 60 may be formed of fibers and resin that binds the fibers together. In an exemplary embodiment, the fiber reinforced composite blank 60 has a thickness indicated by double headed arrow 62 of from about 10 to about 20 mm, such as from about 12 to about 18 mm.

In an exemplary embodiment, the fiber reinforced composite blank 60 is preheated (indicated by lines 64) to help remove moisture. Removing moisture from the fiber reinforced composite blank 60 has been found to help improve subsequent processing including cycle time and heating and forming of the fiber reinforced composite blank 60. In an exemplary embodiment, the fiber reinforced composite blank 60 is preheated to a temperature of from about 95 to about 115° C.

Figure 7:
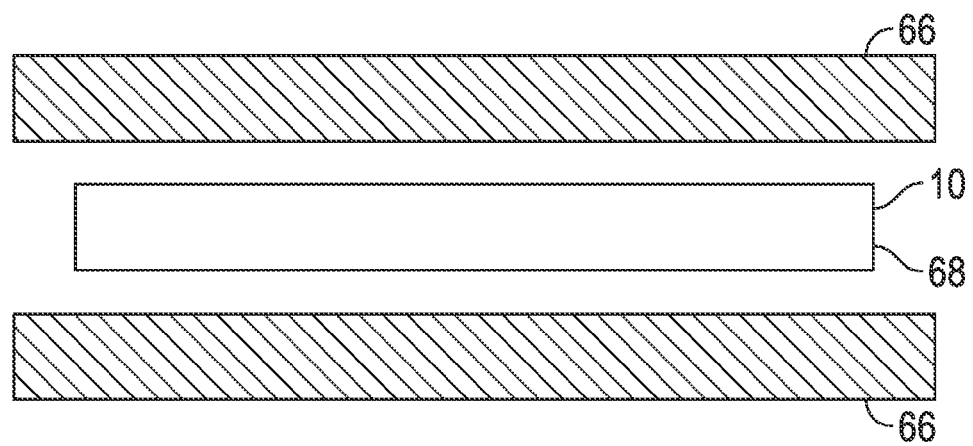
FIG. 7 illustrates, in cross-sectional view, an interior panel for a motor vehicle at a further advanced fabrication stage in accordance with an exemplary embodiment.
Figure 8:
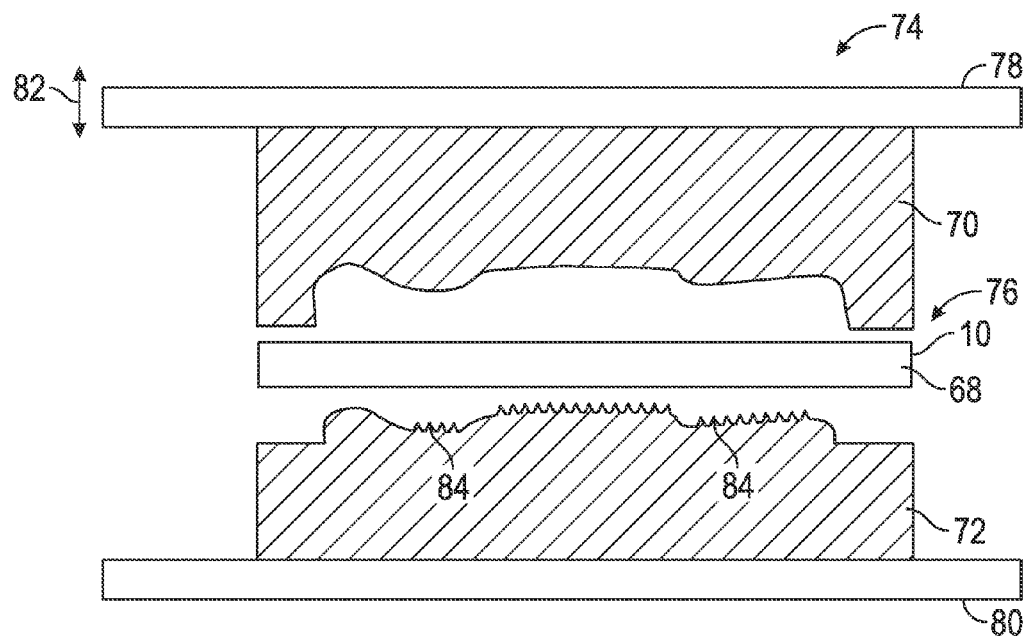
FIG. 8 illustrates, in cross-sectional view, an interior panel for a motor vehicle at a further advanced fabrication stage in accordance with an exemplary embodiment.

FIGS. 7-8 illustrate, in cross-sectional views, the interior panel 10 at further advanced fabrication stages in accordance with an exemplary embodiment. As illustrated, the fiber reinforced composite blank 60 is heated by heaters 66 (e.g., oven with heating elements) to form a heated fiber reinforced composite blank 68. The fiber reinforced composite blank 60 is heated, for example, to a temperature above the glass transition temperature or softening temperature of the resin, e.g., greater than the T(g) of the thermoplastic resin, so that the heated fiber reinforced composite blank 68 is relatively soft and formable. In an exemplary embodiment, the heated fiber reinforced composite blank 68 is formed having a temperature of from about 190 about 250° C. The heated fiber reinforced composite blank 68 is passed along and positioned between matched die portions 70 and 72 of a compression mold arrangement 74 that is in an opened position 76.

As illustrated, the compression mold arrangement 74 is configured including a vertically oriented compression press for compression molding the heated fiber reinforced composite blank 68. The compression mold arrangement 74 includes upper and lower platens 78 and 80 in which the upper platen 78 is configured to move along a vertical axis (indicated by double headed arrow 82) and the lower platen 80 is fixed in position. The matched die portion 70 is operatively coupled to the upper platen 78 and the matched die portion 72 is operatively coupled to the lower platen 80. In an exemplary embodiment, the matched die portion 72 includes a plurality of positive features 84 configured to form the inwardly tapered pockets 20 as discussed above in relation to FIGS. 1-5 into the heated fiber reinforced composite blank 68.

Figure 9:
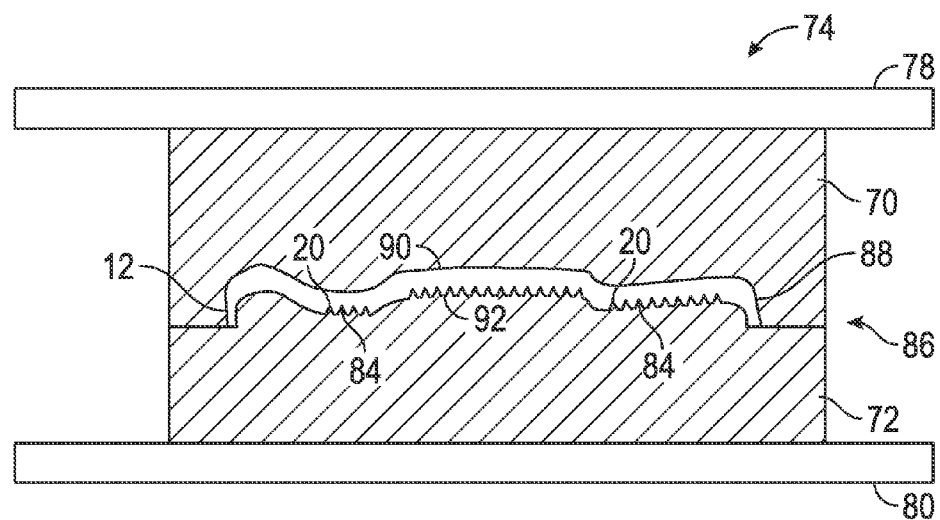
FIG. 9 illustrates, in cross-sectional view, an interior panel for a motor vehicle at a further advanced fabrication stage in accordance with an exemplary embodiment.

Referring to FIGS. 8-9, the upper platen 78 advances downward along the vertical axis 82 to move the matched die portions 70 and 72 together from the opened position 76 to a close position 86 to shaped, compress, and cool the heated fiber reinforced composite blank 68. In the close position 86, the matched die portions 70 and 72 form a cavity 88 that is defined by mold surfaces 90 and 92 to define a 3-D shape as is well known in the art.

In the closed position 86, the heated fiber reinforced composite blank 68 is compressed, cooled, and has a shape that is defined by the cavity 88 and that includes the inwardly tapered pockets 20 formed by the positive features 84 to produce the fiber reinforced composite substrate 12 as discussed above. In an exemplary embodiment, the fiber reinforced composite substrate 12 is cooled to a temperature of from about 20 to about 100° C. before moving the matched die portions 70 and 72 back to the opened position 76 and being removed from the compression mold arrangement 74.

Figure 10:
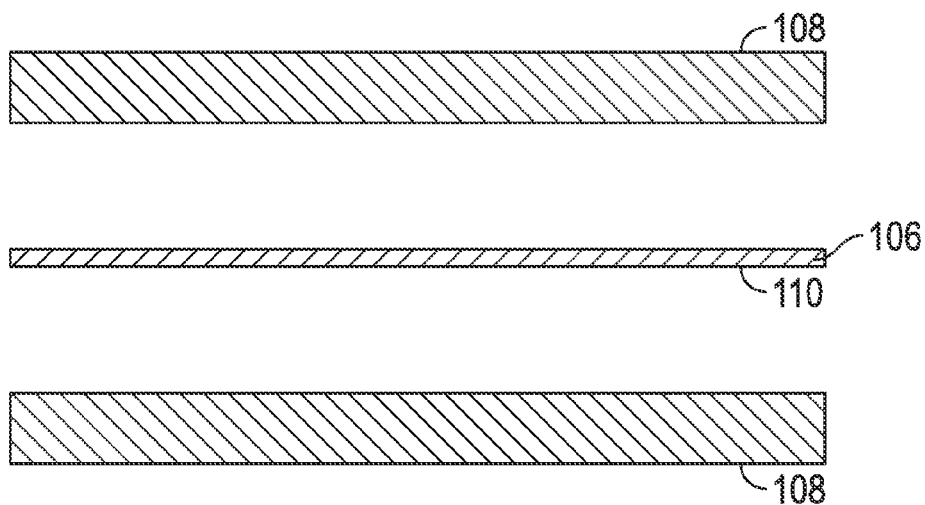
FIG. 10 illustrates, in cross-sectional view, a cover skin for an interior panel at an intermediate fabrication stage in accordance with an exemplary embodiment.
Figure 11:
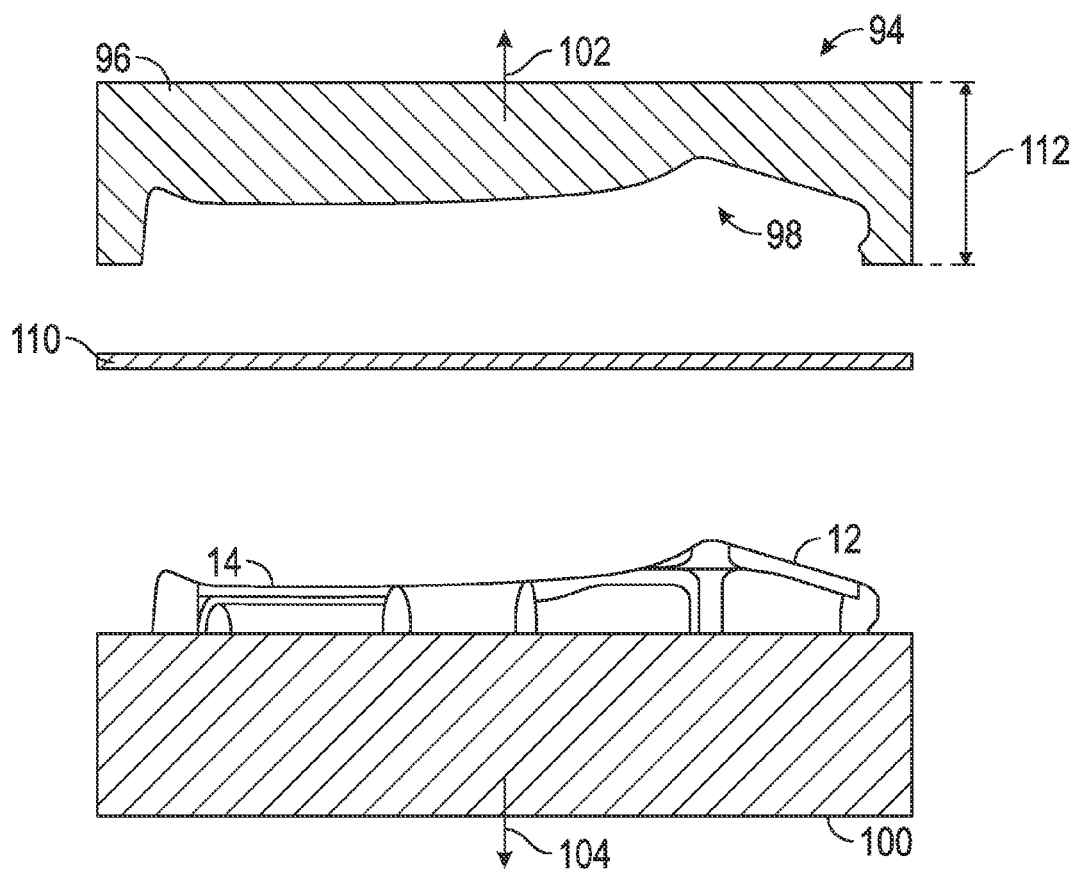
FIG. 11 illustrates, in cross-sectional view, an interior panel for a motor vehicle at a further advanced fabrication stage in accordance with an exemplary embodiment.

Referring to FIGS. 10-11, the method continues by transferring the fiber reinforced composite substrate 12 to a thermoforming tool 94. As illustrated, the thermoforming tool 94 has an upper die portion 96 that includes a cavity 98, which may be grained or un-grained, and a lower die portion 100 that is configured to fixture the fiber reinforced composite substrate 12. In an exemplary embodiment, the upper die portion 96 and independently the lower die portion 100 are configured to pull vacuums (indicated by arrows 102 and 104). A cover skin 106 is heated by heating elements 108 to form a heated cover skin 110. In an exemplary embodiment, the cover skin 106 is formed of a thermoplastic material, such as polypropylene, thermoplastic olefin (TPO), polyvinyl chloride (PVC), or the like, and is heated to a temperature above its glass transition temperature to soften the material for formability. In one example, the cover skin 106 is heated to a temperature of about 180 to about 225° C.

Figure 12:
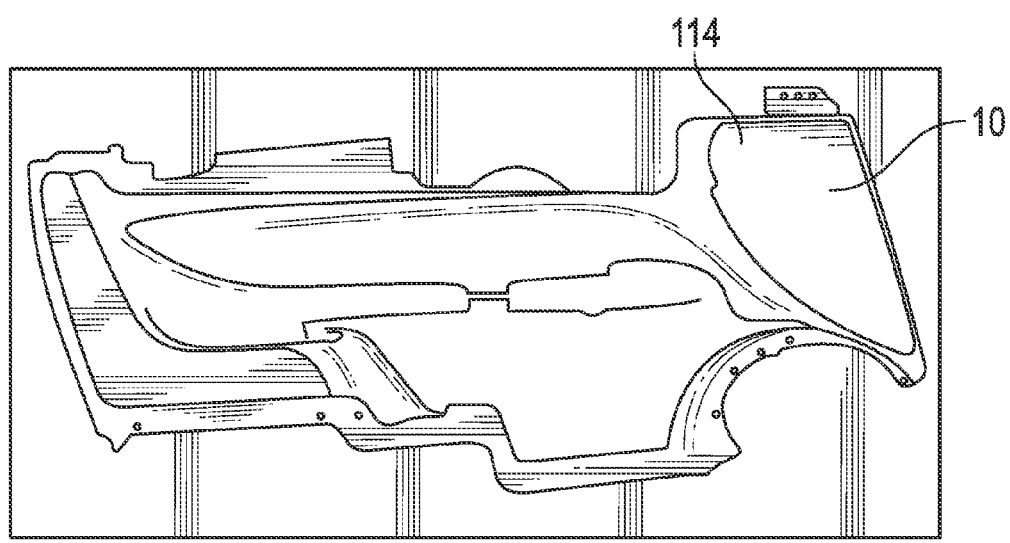
FIG. 12 illustrates, in perspective view, an interior panel for a motor vehicle at a later fabrication stage in accordance with an exemplary embodiment.

The heated cover skin 110 is positioned in the thermoforming tool 94 between the fiber reinforced composite substrate 12 and the upper die portion 96. The upper and lower die portions 96 and 100 are configured to move relative to each other along a vertical axis (indicated by double headed arrow 112). In an exemplary embodiment, during thermoforming, the heated cover skin 110 is initially pulled or sucked into the cavity 98 by the vacuum 102 as the upper and lower die portions 96 and 100 move towards each other. As the upper and lower die portions 96 and 100 approach a close position, the vacuum 102 is discontinued and the vacuum 104 is initiated. Natural porosity or holes (not shown) formed in the fiber reinforced composite substrate 12 allow the vacuum 104 to remove air between the heated cover skin 110 and the fiber reinforced composite substrate 12, thereby creating a vacuum between the heated cover skin 110 and the substrate 12 to facilitate thermoforming to form the interior panel 10 as a covered interior panel 114 as illustrated in FIG. 12. In an exemplary embodiment, adhesive is applied to the first side 14 of the fiber reinforced composite substrate 12 prior to thermoforming to help adhere the heated cover skin 110 to the substrate 12.

Accordingly, interior panels for motor vehicles and methods for making such interior panels have been described. In an exemplary embodiment, an interior panel comprises a fiber reinforced composite substrate that has a first side and a second side that is opposite the first side. The fiber reinforced composite substrate defines a plurality of inwardly tapered pockets. The inwardly tapered pockets are arranged proximate to each other and extend between the first and second sides. Each of the inwardly tapered pockets has an open end that is disposed in the second side and a closed end that is disposed adjacent to the first side.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:
1. An interior panel for a motor vehicle comprising:
a fiber reinforced composite substrate having a first side and a planar second side that is opposite the first side, wherein the fiber reinforced composite substrate defines a plurality of inwardly tapered pockets arranged proximate to each other and extending between the first and second sides, and wherein each of the inwardly tapered pockets has an open end that is disposed in the planar second side and a closed end that is disposed adjacent to the first side, wherein each of the inwardly tapered pockets is defined by inclined sidewalls that are formed in the fiber reinforced composite substrate extending from the open end and converging at the closed end such that the closed end is configured as a substantially pointed corner, wherein the inwardly tapered pockets each has a tapered profile and the first side that is directly opposite the open ends of the inwardly tapered pockets has a smooth profile that is spatially independent from the tapered profile; and a cover skin overlying the first side of the fiber reinforced composite substrate, wherein the cover skin comprises polypropylene, thermoplastic olefin (TPO), polyvinyl chloride (PVC), or a combination thereof.

2. The interior panel of claim 1, wherein each of the inwardly tapered pockets has a 3 sided pyramidal shape.

3. The interior panel of claim 1, wherein each of the inwardly tapered pockets has a 4 sided pyramidal shape.

4. The interior panel of claim 1, wherein each of the inwardly tapered pockets has a dimple shape.

5. The interior panel of claim 1, wherein adjacent open ends of the inwardly tapered pockets are spaced apart from each other a distance of from about 2 to about 10 mm.

6. The interior panel of claim 1, wherein each of the inwardly tapered pockets has a depth of from about 0.5 to about 1.5 mm.

7. The interior panel of claim 1, wherein each of the open ends has a maximum dimension of from about 2 to about 5 mm.

8. The interior panel of claim 1, wherein each of the inwardly tapered pockets has a depth to open end maximum dimension ratio of from about 1:6 to 1:1.

9. The interior panel of claim 1, wherein the fiber reinforced composite substrate has a remaining thickness from the closed end to the first side associated with each of the inwardly tapered pockets of from about 1 to about 2 mm.

10. The interior panel of claim 1, wherein the fiber reinforced composite substrate comprises natural fibers.

11. The interior panel of claim 1, wherein the fiber reinforced composite substrate comprises polypropylene.

12. The interior panel of claim 1, wherein each of the inclined sidewalls extends from the planar second side to the first side at an angle of from about 20° to about 50° from the planar second side.

13. A method for making interior panel for a motor vehicle, the method comprising the steps of:

heating a fiber reinforced composite blank to form a heated fiber reinforced composite blank;

compression molding the heated fiber reinforced composite blank to form a fiber reinforced composite substrate having a first side and a planar second side and defining a plurality of inwardly tapered pockets arranged proximate to each other and extending between the first and second sides, wherein each of the inwardly tapered pockets has an open end that is disposed in the planar second side and a closed end that is disposed adjacent to the first side, and wherein each of the inwardly tapered pockets is defined by inclined sidewalls that are formed in the fiber reinforced composite substrate extending from the open end and converging at the closed end such that the closed end is configured as a substantially pointed corner, and wherein the inwardly tapered pockets each has a tapered profile and the first side that is directly opposite the open ends of the inwardly tapered pockets has a smooth profile that is spatially independent from the tapered profile; and thermoforming a cover skin overlying the first side of the fiber reinforced composite substrate, wherein the cover skin comprises polypropylene, thermoplastic olefin (TPO), polyvinyl chloride (PVC), or a combination thereof.

* * * * *